US011474495B2

(12) United States Patent
Sun et al.

(10) Patent No.: US 11,474,495 B2
(45) Date of Patent: Oct. 18, 2022

(54) FAULT DIAGNOSIS METHOD AND APPARATUS FOR NUMERICAL CONTROL MACHINE TOOL

(71) Applicant: Siemens Aktiengesellschaft, Munich (DE)

(72) Inventors: Qi Sun, Beijing (CN); Armin Roux, Erlangen (DE); Yunhua Fu, Princeton, NJ (US); Shun Jie Fan, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 65 days.

(21) Appl. No.: 16/651,642

(22) PCT Filed: Sep. 30, 2017

(86) PCT No.: PCT/CN2017/104947
§ 371 (c)(1),
(2) Date: Mar. 27, 2020

(87) PCT Pub. No.: WO2019/061481
PCT Pub. Date: Apr. 4, 2019

(65) Prior Publication Data

US 2020/0310380 A1 Oct. 1, 2020

(51) Int. Cl.
*G05B 19/406* (2006.01)
*G05B 19/408* (2006.01)
*G05B 19/4155* (2006.01)

(52) U.S. Cl.
CPC ......... *G05B 19/406* (2013.01); *G05B 19/408* (2013.01); *G05B 19/4155* (2013.01); *G05B 2219/32356* (2013.01)

(58) Field of Classification Search
None
See application file for complete search history.

(56) References Cited

U.S. PATENT DOCUMENTS 7,373,225 B1 * 5/2008 Grier .................. G05B 23/0248 340/438
2005/0021294 A1 1/2005 Davis et al.
(Continued)

FOREIGN PATENT DOCUMENTS

CN 101192997 A * 6/2008
CN 102183945 A 9/2011
(Continued)

OTHER PUBLICATIONS

Benware et al., “Determining a Failure Root Cause Distribution From a Population of Layout-Aware Scan Diagnosis Results”, 2012, IEEE Design & Test of Computers, pp. 8-14 (Year: 2012).*
(Continued)

*Primary Examiner* — Mohammad Ali
*Assistant Examiner* — David Earl Ogg
(74) *Attorney, Agent, or Firm* — Harness, Dickey & Pierce, P.L.C.

(57) ABSTRACT

In the technical field of industrial automation, a fault diagnosis method and apparatus for a numerical control machine tool are disclosed which can improve the efficiency of diagnosing faults of numerical control machine tools by utilizing feedback information provided by users. In a fault diagnosis method of an embodiment, the fault diagnosis apparatus receives a fault symptom to be diagnosed from a user terminal, diagnoses the fault for the fault symptom to be diagnosed, returns a fault diagnosis result to the user terminal, receives feedback on the fault diagnosis result from the user terminal, and adjusts the diagnosis policy for the fault symptom to be diagnosed according to the fault diagnosis result if the feedback of the user on the fault diagnosis result indicates that the fault has been cleared.

12 Claims, 6 Drawing Sheets

100 30 40 401 402 204 201 203 202 202 201 50 50 60 70

(56) References Cited

U.S. PATENT DOCUMENTS

| | | | | |
|---|---|---|---|---|
| 2008/0204316 | A1* | 8/2008 | Brodie | G01S 5/0294 342/357.31 |
| 2009/0327810 | A1* | 12/2009 | Moorhouse | H04L 41/0631 714/26 |
| 2014/0114613 | A1 | 4/2014 | Wang et al. | |

FOREIGN PATENT DOCUMENTS

| | | | | |
|---|---|---|---|---|
| CN | 102571987 | A | | 7/2012 |
| CN | 102937798 | A | * | 2/2013 |
| CN | 105391579 | A | | 3/2016 |
| CN | 106254139 | A | * | 12/2016 |
| CN | 106254139 | A | | 12/2016 |
| CN | 106598020 | A | | 4/2017 |
| JP | 2014081880 | A | | 5/2014 |

OTHER PUBLICATIONS

Khalid, Al-Jonid et al: "A new fault classification model for prognosis and diagnosis in CNC machine": Control and Decision Conference (CCDC); 2013 25TH Chinese; IEEE; May 25, 2013; pp. 3538-3543; XP032435528; DOI: 10.1109/CCDC.2013.6561561; ISBN: 978-1-4673-5533-9; 2013.

Extended European Search Report dated Mar. 22, 2021.

International Search Report PCT/ISA/210 and Written Opinion PCT/ISA/237 for International Application No. PCT/CN2017/104947 dated Jun. 22, 2018.

* cited by examiner

FAULT DIAGNOSIS METHOD AND APPARATUS FOR NUMERICAL CONTROL MACHINE TOOL

PRIORITY STATEMENT

This application is the national phase under 35 U.S.C. § 371 of PCT International Application No. PCT/CN2017/104947 which has an International filing date of Sep. 30, 2017, which designated the United States of America, the entire contents of which are hereby incorporated herein by reference.

FIELD

The present application generally relates to the technical field of industrial automation, and in particular relates to a fault diagnosis method and apparatus for a numerical control machine tool.

BACKGROUND

A computer numerical control (CNC) machine tool, critical equipment in a manufacturing industrial system, is an automated machine tool controlled by a computer program and is characterized by a high part processing precision and a high degree of automation. The availability of CNC machine tools is critical to the stable operation of the manufacturing industrial system.

The structure of a CNC machine tool is usually very complex. For the sake of simplicity, FIG. 1 shows a block diagram of a feed system of a CNC machine tool, wherein the feed system can be considered an example of a CNC machine tool. As shown in FIG. 1, the feed system of the CNC machine tool 10 comprises a programmable logical controller (PLC) 101, a servo drive 102, a servo motor 103, a coupler 104, two bearings 105, a ball screw pair 106 and an encoder 107. The PLC 101 is controlled by the computer program in the encoder 107, the servo drive 102 drives the servo motor 103 to rotate, and then the servo motor 103 drives the nut in the ball screw pair 103 to rotate through the coupler 104 and the bearings 105.

It can be seen that a CNC machine tool is structurally complex and comprises a plurality of complex and collaborative subsystems, for example, mechanical, electrical, hydraulic and start-up subsystems. The irregularity and uncertainty of fault symptoms increase the difficulty of fault diagnosis or may cause a long-time abnormal operation of the equipment or even a service interruption.

Currently, commonly used fault diagnosis methods for a CNC machine tool include fault tree analysis, fault propagation model analysis and case-based reasoning analysis. A mathematical modeling method based on digital signals is usually used to monitor and diagnose faults.

SUMMARY

This inventors have discovered that such a method is suitable for certain and regular digital signals. The inventors have further discovered that, in view of the uncertainty of signals and/or information generated by a CNC machine tool, it is difficult to efficiently diagnose faults by using such a method.

In view of this, at least one embodiment of the present invention provides a fault diagnosis method and apparatus for a numerical control machine tool, and at least one embodiment of the present invention can improve the efficiency of diagnosing faults of numerical control machine tools by utilizing feedback information provided by users.

In a first embodiment, a fault diagnosis method for a numerical control machine tool is provided, and the method can be executed by a fault diagnosis apparatus and comprises: receiving a fault symptom to be diagnosed from a user of a user terminal, diagnosing the fault for the fault symptom to be diagnosed, returning a fault diagnosis result to the user terminal, receiving the feedback on the fault diagnosis result from the user of the user terminal, and adjusting the diagnosis policy for the fault symptom to be diagnosed according to the fault diagnosis result if feedback of the user on the fault diagnosis result indicates that the fault has been cleared.

In a second embodiment, a fault diagnosis method for a numerical control machine tool is provided. The method can be executed by a user terminal and comprises: receiving a fault symptom to be from a user, sending the fault symptom to be diagnosed to a fault diagnosis apparatus for a fault diagnosis, receiving a fault diagnosis result of the fault symptom to be diagnosed from the fault diagnosis apparatus, providing the fault diagnosis result to the user, receiving feedback of the user on the fault diagnosis result, and sending the feedback of the user on the fault diagnosis result to the fault diagnosis apparatus.

In a third embodiment, a fault diagnosis apparatus for a numerical control machine tool is provided and the apparatus comprises:

a user interface module, used to receive a fault symptom to be diagnosed from a user of a user terminal, and a fault diagnosis module, used to diagnose the fault for the fault symptom to be diagnosed, wherein, the user interface module is further used to return a fault diagnosis result to the user terminal and receive feedback on the fault diagnosis result from the user of the user terminal, and the fault diagnosis module is further used to adjust the diagnosis policy for the fault symptom to be diagnosed according to the fault diagnosis result if the feedback of the user on the fault diagnosis result indicates that the fault has been cleared.

In a fourth embodiment, a user terminal is provided and the user terminal comprises:

a user interface module, used to receive a fault symptom to be diagnosed from a user, and a communication module, used to send the fault symptom to be diagnosed to a fault diagnosis apparatus for a fault diagnosis and receive a fault diagnosis result of the fault symptom to be diagnosed from the fault diagnosis apparatus, wherein the user interface module is further used to provide the fault diagnosis result for the user and receive feedback of the user on the fault diagnosis result, and the communication module is further used to send the feedback of the user on the fault diagnosis result to the fault diagnosis apparatus.

In a fifth embodiment, a fault diagnosis system for a numerical control machine tool is provided and the system comprises:

a fault diagnosis information database, containing at least one fault symptom and an association between each fault symptom and at least one possible fault causing the fault symptom, and a fault diagnosis apparatus, used to receive a fault symptom to be diagnosed from a user, diagnose the fault for the fault symptom to be diagnosed based on the fault diagnosis information database, return a fault diagnosis result to the user, receive the feedback of the user on the fault diagnosis result, and adjusts the diagnosis policy for the fault symptom to be diagnosed according to the fault diagnosis result if the feedback of the user on the fault diagnosis result indicates that the fault has been cleared.

In a sixth embodiment, a fault diagnosis apparatus for a numerical control machine tool is provided and the apparatus comprises at least one memory used to stored machine readable programs and at least one processor used invoke the machine readable programs to execute the method provided in the first embodiment, any possible implementation mode in the first embodiment, the second embodiment or any possible implementation mode in the second embodiment.

In a seventh embodiment, a machine readable storage medium in which machine readable instructions are stored is provided. When the machine readable instructions are executed by at least one processor, the at least one processor executes the method provided in the first embodiment, any possible implementation mode in the first embodiment, the second embodiment or any possible implementation mode in the second embodiment.

DESCRIPTION OF REFERENCE NUMERALS IN THE DRAWINGS

Figure 1:
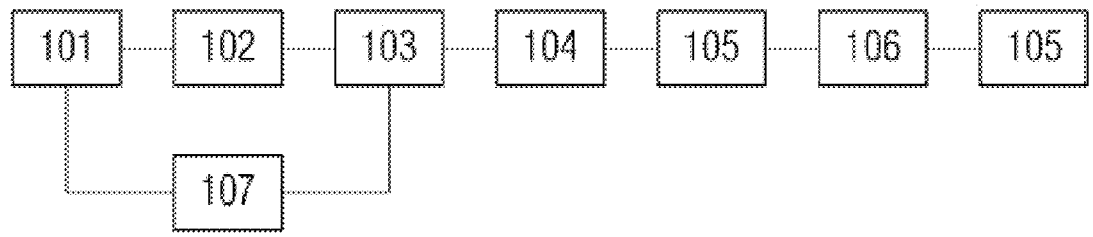
FIG. 1 is a schematic diagram of the feed system of a numerical control machine tool.

| | | |
|---|---|---|
| 101: PLC | 102: Servo drive | 103: Servo motor |
| 104: Coupler | 105: Bearing | 106: Ball screw pair |
| 107: Encoder | 10: Numerical control machine tool | |
| 100: Fault diagnosis system | 30: Fault diagnosis information database generating device | 40: Fault diagnosis apparatus |
| 50: User terminal | 60: User | 204: Fault diagnosis information database |
| 201: Fault symptom to be diagnosed | 202: Fault diagnosis result | 203: Feedback of the user on the fault diagnosis result |
| 401: User interface module | 402: Fault diagnosis module | 70: Fault diagnosis expert |
| 205: Fault symptom list | | |

S301: Send a fault symptom list 205 to the user terminal 50
S302: Present the fault symptom list 205 to the user 60
S303: Receive the fault symptom 201 selected by the user 60 from the fault symptom list 205
S304: Receive the fault symptom 201 selected by the user 60 of the user terminal 50 from the fault symptom list
S305: Diagnose the fault for the fault symptom 201 to be diagnosed based on the fault diagnosis information database 204
S306: Return the fault diagnosis result 202 to the user terminal 50
S307: Present the fault diagnosis result 202 to the user 60
S308: The user 60 clears the fault according to the fault diagnosis result 202
S309: The user 60 enters feedback 203 on the fault diagnosis result 202
S310: The user terminal 50 sends the feedback 203 of the user 60 on the fault diagnosis result 202 to the fault diagnosis apparatus 40
S311: The fault diagnosis apparatus 40 determines whether the fault has been cleared according to the feedback 203
Y: The fault has been cleared N: The fault has not been cleared
S312: Adjust the diagnosis policy for the fault symptom 201 to be diagnosed
S313: Send the fault symptom 201 to be diagnosed to a fault diagnosis expert 70
S314: The fault diagnosis expert 70 diagnoses the fault for the fault symptom 201 to be diagnosed
S315: The fault diagnosis apparatus 40 receives the fault diagnosis result 202 from the fault diagnosis expert 70
S316: The fault diagnosis apparatus 40 sends the fault diagnosis result 202 to the user terminal 50
S317: The user terminal 50 presents the fault diagnosis result 202 to the user 60
S318: The user 60 clears the fault according to the fault diagnosis result 202
S319: The user 60 enters the feedback 203 on the fault diagnosis result 202
S320: The user terminal 50 sends the feedback 203 of the user 60 on the fault diagnosis result 202 to the fault diagnosis apparatus 40
S321: The fault diagnosis apparatus 40 determines whether the fault has been cleared according to the feedback 203
S322: Adjust the diagnosis policy for the fault symptom 201 to be diagnosed
S323: Update the fault diagnosis information database 204 according to the fault diagnosis result 202 of the fault diagnosis expert 70
S401: Send a fault symptom list 205 to the user terminal 50
S402: Present the fault symptom list 205 to the user 60
S403: Receive the fault symptom 201 to be diagnosed from the user 60

-continued

S404: Receive the fault symptom 201 from the user 60 of the user terminal 50
S405: Send the fault symptom 201 to be diagnosed to a fault diagnosis expert 70
S406: The fault diagnosis expert 70 diagnoses the fault for the fault symptom 201 to be diagnosed
S407: The fault diagnosis apparatus 40 receives the fault diagnosis result 202 from the fault diagnosis expert 70
S408: The fault diagnosis apparatus 40 sends the fault diagnosis result 202 to the user terminal 50
S409: The user terminal 50 presents the fault diagnosis result 202 to the user 60
S410: The user 60 clears the fault according to the fault diagnosis result 202
S411: The user 60 enters the feedback 203 on the fault diagnosis result 202
S412: The user terminal 50 sends the feedback 203 of the user 60 on the fault diagnosis result 202 to the fault diagnosis apparatus 40
S413: The fault diagnosis apparatus 40 determines whether the fault has been cleared according to the feedback 203
S414: Adjust the diagnosis policy for the fault symptom 201 to be diagnosed
S415: Update the fault diagnosis information database 204 according to the fault diagnosis result 202 of the fault diagnosis expert 70
S501: Send a fault symptom list 205 to the user terminal 50
S502: Receive the fault symptom 201 to be diagnosed from the user terminal 50
S503: Determine whether the fault symptom 201 to be diagnosed is selected from the fault symptom list 205 or entered by the user 60
S504: Diagnose the fault for the fault symptom 201 to be diagnosed based on the fault diagnosis information database 204
S505: Send the fault symptom 201 to be diagnosed to a fault diagnosis expert 70
S506: Receive the fault diagnosis result 202 from the fault diagnosis expert 70
S507: Send the fault diagnosis result 202 to the user terminal 50
S508: Receive the feedback 203 on the fault diagnosis result 202 from the user 60 of the user terminal 50
S509: The fault diagnosis apparatus 40 determines whether the fault has been cleared according to the feedback 203
S510: Adjust the diagnosis policy for the fault symptom 201 to be diagnosed (update the fault diagnosis information database 204)
S511: Send the feedback 203 of the user 60 on the fault diagnosis result 202 to the fault diagnosis expert 70
S512: Receive the fault diagnosis result 202 from the fault diagnosis expert 70

| | | |
|---|---|---|
| 403: At least one processor | 404: At least one memory | 405: At least one communication interface |
| 501: User | 502: Communication interface module module | 503: At least one processor |
| 504: At least one memory | 505: Display | 506: Communication interface |
| S1001: Set fault conditions | S1002: Run the simulation model of a numerical control machine tool | S1003: Trace back faults |
| S1004: Generate a fault diagnosis information database | | |

1103, 1103(1)-1103(m), 1103(11)-1103(q1), 1103(12)-1103(1 h), 1103 (3k), 1103(qs): Faults
1104, 1104 (1)-1104 (n): Fault symptoms
1102: Fault condition

DETAILED DESCRIPTION OF THE EXAMPLE EMBODIMENTS

In a first embodiment, a fault diagnosis method for a numerical control machine tool is provided, and the method can be executed by a fault diagnosis apparatus and comprises: receiving a fault symptom to be diagnosed from a user of a user terminal, diagnosing the fault for the fault symptom to be diagnosed, returning a fault diagnosis result to the user terminal, receiving the feedback on the fault diagnosis result from the user of the user terminal, and adjusting the diagnosis policy for the fault symptom to be diagnosed according to the fault diagnosis result if feedback of the user on the fault diagnosis result indicates that the fault has been cleared.

In the method, after the fault diagnosis result is returned to the user, the feedback of the user on the fault diagnosis result is received, and the fault diagnosis policy is adjusted according to the feedback. Thus, the accuracy of a fault diagnosis is improved.

Alternatively, in an embodiment, diagnosing the fault for the fault symptom to be diagnosed comprises diagnosing the fault for the fault symptom to be diagnosed based on a fault diagnosis information database, wherein the diagnosis information database contains at least one fault symptom and the association between each fault symptom and at least one possible fault causing the fault symptom; after receiving the feedback on the fault diagnosis result from the user of the user terminal, the method further comprises: if the feedback of the user on the fault diagnosis result indicates that the fault has not been cleared, sending the fault symptom to be diagnosed to a fault diagnosis expert for a fault diagnosis;

receiving the fault diagnosis result returned by the fault diagnosis expert;

returning the fault diagnosis result of the fault diagnosis expert to the user terminal;

receiving feedback on the fault diagnosis result of the fault diagnosis expert from the user of the user terminal;

Further, if the feedback of the user on the fault diagnosis result of the fault diagnosis expert indicates that the fault has been cleared, it includes updating the fault diagnosis database according to the fault diagnosis result of the fault diagnosis expert and adjusting the diagnosis policy for the fault symptom to be diagnosed.

Alternatively, in an embodiment, the fault diagnosis result of the fault diagnosis expert contains at least one possible fault causing the fault symptom to be diagnosed, the feedback of the user on the fault diagnosis result of the fault diagnosis expert indicates that the fault has been cleared, and the feedback of the user on the fault diagnosis result of the fault diagnosis expert further contains the fault actually causing the fault symptom to be diagnosed; updating the fault diagnosis information database according to the second diagnosis result comprises:

adding an association between the fault symptom to be diagnosed and the fault fed back by the user to actually cause the fault symptom to the fault diagnosis information database.

Alternatively, in an embodiment, the fault diagnosis result contains at least one possible fault causing the fault symptom to be diagnosed and indicative information on the probability of occurrence of each possible fault; the feedback of the user on the fault diagnosis result indicates that the fault has been cleared, and the feedback of the user on the fault diagnosis result further contains the fault actually causing the fault symptom to be diagnosed; adjusting the diagnosis policy for the fault symptom to be diagnosed according to the fault diagnosis result comprises increasing the probability of the fault actually causing the fault symptom to be diagnosed.

When providing feedback on the fault diagnosis result, the user can indicate whether the fault has been cleared. In addition, if the fault diagnosis result indicates that the fault has been cleared, the user can feed back the fault actually causing the fault symptom to be diagnosed. In this way, when adjusting the fault diagnosis policy, the fault diagnosis apparatus can increase the probability of the fault actually causing the fault symptom to be diagnosed. If the fault diagnosis result indicates that the fault has not been cleared, the fault diagnosis apparatus can send the fault symptom to be diagnosed to a fault diagnosis expert, and the fault diagnosis apparatus can send the fault diagnosis result of the fault diagnosis expert to the user and receive the feedback of the user. If the feedback of the user indicates that the fault has been cleared, the fault diagnosis apparatus updates the fault diagnosis information database according to the fault diagnosis result of the fault diagnosis expert (for example, adds the association between the fault symptom to be diagnosed and the fault fed back by the user to actually cause the fault symptom to the fault diagnosis information database). In this way, the fault diagnosis policy is adjusted according to the feedback of the user and the fault diagnosis information database is updated. On the one hand, the accuracy of the current fault diagnosis is satisfied. On the other hand, since the fault diagnosis information database is updated, the diagnosis of the same fault symptom in future can be directly based on the fault diagnosis information database. Thus the dependency on a fault diagnosis expert is greatly reduced and the fault diagnosis efficiency is improved.

Alternatively, in an embodiment, before receiving a fault symptom to be diagnosed from a user of a user terminal, the method further comprises sending a fault symptom list to the user terminal, wherein the fault symptom list contains at least one fault symptom; receiving the fault symptom to be diagnosed from the user of the user terminal comprises receiving the fault symptom selected by the user from the fault symptom list; diagnosing the fault for the fault symptom to be diagnosed comprises diagnosing the fault for the fault symptom based on a fault diagnosis information database, wherein the diagnosis information database contains at least one fault symptom and an association between each fault symptom and at least one possible fault causing the fault symptom; or receiving the fault symptom to be diagnosed from a user of a user terminal comprises receiving a semantic description of the fault symptom to be diagnosed from the user of the user terminal; diagnosing the fault for the fault symptom to be diagnosed comprises receiving the diagnosis result of a fault diagnosis expert on the fault symptom to be diagnosed.

In this way, the fault diagnosis apparatus can diagnose the fault for a fault symptom, regardless of whether the fault symptom to be diagnosed has appeared before or appeared for the first time.

In a second embodiment, a fault diagnosis method for a numerical control machine tool is provided. The method can be executed by a user terminal and comprises: receiving a fault symptom to be from a user, sending the fault symptom to be diagnosed to a fault diagnosis apparatus for a fault diagnosis, receiving a fault diagnosis result of the fault symptom to be diagnosed from the fault diagnosis apparatus, providing the fault diagnosis result to the user, receiving feedback of the user on the fault diagnosis result, and sending the feedback of the user on the fault diagnosis result to the fault diagnosis apparatus.

In the method, after the fault diagnosis result is returned to the user, the feedback of the user on the fault diagnosis result is received, and the fault diagnosis policy is adjusted according to the feedback. Thus, the accuracy of the fault diagnosis is improved.

Alternatively, receiving the feedback of the user on the fault diagnosis result further comprises receiving the fault fed back by the user to actually cause the fault symptom.

In a third embodiment, a fault diagnosis apparatus for a numerical control machine tool is provided and the apparatus comprises:

a user interface module, used to receive a fault symptom to be diagnosed from a user of a user terminal, and a fault diagnosis module, used to diagnose the fault for the fault symptom to be diagnosed, wherein, the user interface module is further used to return a fault diagnosis result to the user terminal and receive feedback on the fault diagnosis result from the user of the user terminal, and the fault diagnosis module is further used to adjust the diagnosis policy for the fault symptom to be diagnosed according to the fault diagnosis result if the feedback of the user on the fault diagnosis result indicates that the fault has been cleared.

After returning the diagnosis result to the user, the fault diagnosis apparatus receives the feedback of the user on the fault diagnosis result and adjusts the fault diagnosis policy according to the feedback. Thus, the accuracy of the fault diagnosis is improved.

Alternatively, in an embodiment, when diagnosing the fault for the fault symptom to be diagnosed, the fault diagnosis module is specifically used to diagnose the fault for the fault symptom to be diagnosed based on a fault diagnosis information database, wherein the diagnosis information database contains at least one fault symptom and an association between each fault symptom and at least one possible fault causing the fault symptom, the fault diagnosis module is further used to send the fault symptom to be diagnosed to a fault diagnosis expert for a fault diagnosis and receive the fault diagnosis result returned by the fault diagnosis expert if the feedback of the user on the fault diagnosis result indicates that the fault has not been cleared;

the user interface module is further used to return the fault diagnosis result of the fault diagnosis expert to the user terminal and receive the feedback on the fault diagnosis result of the fault diagnosis expert from the user of the user terminal;

the fault diagnosis module is further used to adjust the diagnosis policy for the fault symptom to be diagnosed if the feedback of the user on the fault diagnosis result of the fault diagnosis expert indicates that the fault has been cleared, and update the fault diagnosis information database according to the fault diagnosis result of the fault diagnosis expert if the feedback of the user on the fault diagnosis result of the fault diagnosis expert indicates that the fault has been cleared.

Alternatively, in an embodiment, the fault diagnosis result of the fault diagnosis expert contains at least one possible fault causing the fault symptom to be diagnosed, the feedback of the user on the fault diagnosis result of the fault diagnosis expert indicates that the fault has been cleared, and the feedback of the user on the fault diagnosis result of the fault diagnosis expert further contains the fault actually causing the fault symptom to be diagnosed; when updating the fault diagnosis information database according to the fault diagnosis result of the fault diagnosis expert, the fault diagnosis module is specifically used to add the association between the fault symptom to be diagnosed and the fault fed back by the user to actually cause the fault symptom to the fault diagnosis information database.

Alternatively, in an embodiment, the fault diagnosis result contains at least one possible fault causing the fault symptom to be diagnosed and indicative information on the probability of occurrence of each possible fault; the feedback of the user on the fault diagnosis result indicates that the fault has been cleared, and the feedback of the user on the fault diagnosis result further contains the fault actually causing the fault symptom to be diagnosed; when adjusting the diagnosis policy for the fault symptom to be diagnosed according to the fault diagnosis result, the fault diagnosis module is specifically used to increase the probability of the fault actually causing the fault symptom to be diagnosed.

When providing a feedback on the fault diagnosis result, the user can indicate whether the fault has been cleared. In addition, if the fault diagnosis result indicates that the fault has been cleared, the user can feed back the fault actually causing the fault symptom to be diagnosed. In this way, when adjusting the fault diagnosis policy, the fault diagnosis apparatus can increase the probability of the fault actually causing the fault symptom to be diagnosed. If the fault diagnosis result indicates that the fault has not been cleared, the fault diagnosis apparatus can send the fault symptom to be diagnosed to a fault diagnosis expert, and the fault diagnosis apparatus can send the fault diagnosis result of the fault diagnosis expert to the user and receive the feedback of the user. If the feedback of the user indicates that the fault has been cleared, the fault diagnosis apparatus updates the fault diagnosis information database according to the fault diagnosis result of the fault diagnosis expert (for example, adds the association between the fault symptom to be diagnosed and the fault fed back by the user to actually cause the fault symptom to the fault diagnosis information database). In this way, the fault diagnosis policy is adjusted according to the feedback of the user and the fault diagnosis information database is updated. On the one hand, the accuracy of the current fault diagnosis is satisfied. On the other hand, since the fault diagnosis information database is updated, the diagnosis of the same fault symptom in future can directly be based on the fault diagnosis information database. Thus the dependency on a fault diagnosis expert is greatly reduced and the fault diagnosis efficiency is improved.

Alternatively, in an embodiment, before receiving a fault symptom to be diagnosed from a user of a user terminal, the user interface module is further used to send a fault symptom list to the user terminal, wherein the fault symptom list contains at least one fault symptom; when receiving the fault symptom to be diagnosed from the user of the user terminal, the user interface module is specifically used to receive the fault symptom selected by the user of the user terminal from the fault symptom list; when diagnosing the fault for the fault symptom to be diagnosed, the fault diagnosis module is specifically used to diagnose the fault for the fault symptom based on a fault diagnosis information database, wherein the diagnosis information database contains at least one fault symptom and the association between each fault symptom and at least one possible fault causing the fault symptom; or when receiving a fault symptom to be diagnosed from a user of a user terminal, the user interface module is specifically used to receive a semantic description of the fault symptom to be diagnosed from the user of the user terminal, and when diagnosing the fault for the fault symptom to be diagnosed, the fault diagnosis module is specifically used to receive the diagnosis result of a fault diagnosis expert on the fault symptom to be diagnosed.

In this way, the fault diagnosis apparatus can diagnose the fault for a fault symptom, regardless of whether the fault symptom to be diagnosed has appeared before or appeared for the first time.

In a fourth embodiment, a user terminal is provided and the user terminal comprises:

a user interface module, used to receive a fault symptom to be diagnosed from a user, and a communication module, used to send the fault symptom to be diagnosed to a fault diagnosis apparatus for a fault diagnosis and receive a fault diagnosis result of the fault symptom to be diagnosed from the fault diagnosis apparatus, wherein the user interface module is further used to provide the fault diagnosis result for the user and receive feedback of the user on the fault diagnosis result, and the communication module is further used to send the feedback of the user on the fault diagnosis result to the fault diagnosis apparatus.

After the fault diagnosis result is returned to the user, the feedback of the user on the fault diagnosis result is received, and the fault diagnosis policy is adjusted according to the feedback. Thus, the accuracy of the fault diagnosis is improved.

Alternatively, in an embodiment, when receiving the feedback of the user on the fault diagnosis result, the user interface module is further used to receive the fault fed back by the user to actually cause the fault symptom.

In a fifth embodiment, a fault diagnosis system for a numerical control machine tool is provided and the system comprises:

a fault diagnosis information database, containing at least one fault symptom and an association between each fault symptom and at least one possible fault causing the fault symptom, and a fault diagnosis apparatus, used to receive a fault symptom to be diagnosed from a user, diagnose the fault for the fault symptom to be diagnosed based on the fault diagnosis information database, return a fault diagnosis result to the user, receive the feedback of the user on the fault diagnosis result, and adjusts the diagnosis policy for the fault symptom to be diagnosed according to the fault diagnosis result if the feedback of the user on the fault diagnosis result indicates that the fault has been cleared.

After returning the diagnosis result to the user, the fault diagnosis apparatus receives the feedback of the user on the fault diagnosis result and adjusts the fault diagnosis policy according to the feedback. Thus, the accuracy of the fault diagnosis is improved.

Alternatively, in an embodiment, after the fault diagnosis apparatus receives the feedback of the user on the fault diagnosis result, if the feedback of the user on the fault diagnosis result indicates that the fault has not been cleared, then the fault diagnosis apparatus is further used to send the fault symptom to be diagnosed to a fault diagnosis expert for a fault diagnosis;

receive the fault diagnosis result returned by the fault diagnosis expert;

return the fault diagnosis result of the fault diagnosis expert to the user;

receive the feedback of the user on the fault diagnosis result of the fault diagnosis expert;

if the feedback of the user on the fault diagnosis result of the fault diagnosis expert indicates that the fault has been cleared, update the fault diagnosis database according to the fault diagnosis result of the fault diagnosis expert and adjust the diagnosis policy for the fault symptom to be diagnosed.

When providing feedback on the fault diagnosis result, the user can indicate whether the fault has been cleared. In addition, if the fault diagnosis result indicates that the fault has been cleared, the user can feed back the fault actually causing the fault symptom to be diagnosed. In this way, when adjusting the fault diagnosis policy, the fault diagnosis apparatus can increase the probability of the fault actually causing the fault symptom to be diagnosed. If the fault diagnosis result indicates that the fault has not been cleared, the fault diagnosis apparatus can send the fault symptom to be diagnosed to a fault diagnosis expert, and the fault diagnosis apparatus can send the fault diagnosis result of the fault diagnosis expert to the user and receive the feedback of the user. If the feedback of the user indicates that the fault has been cleared, the fault diagnosis apparatus updates the fault diagnosis information database according to the fault diagnosis result of the fault diagnosis expert (for example, adds an association between the fault symptom to be diagnosed and the fault fed back by the user to actually cause the fault symptom to the fault diagnosis information database). In this way, the fault diagnosis policy is adjusted according to the feedback of the user and the fault diagnosis information database is updated. On the one hand, the accuracy of the current fault diagnosis is satisfied. On the other hand, since the fault diagnosis information database is updated, the diagnosis of the same fault symptom in future can directly be based on the fault diagnosis information database. Thus the dependency on a fault diagnosis expert is greatly reduced and the fault diagnosis efficiency is improved.

Alternatively, in an embodiment, the system further comprises a fault diagnosis information database generating device used to set at least one fault condition of the numerical control machine tool; a simulation model of the numerical control machine tool is respectively run under each fault condition to generate a fault and at least one fault symptom of the fault is recorded; for each recorded fault symptom, at least one possible fault causing the fault symptom is traced back to establish the association between the fault symptom and the possible fault causing the fault symptom.

Since a simulation model of the numerical control machine tool is run, various fault conditions can be set conveniently to inject faults into the simulation model. The fault diagnosis information database created by use of the method is characterized by full coverage of faults and abundant fault diagnosis information. The result of a fault diagnosis based on such a fault diagnosis information database is more accurate.

Alternatively, in an embodiment, the system is deployed on a cloud. Users can access the fault diagnosis system for a fault diagnosis anywhere at any time.

In a sixth embodiment, a fault diagnosis apparatus for a numerical control machine tool is provided and the apparatus comprises at least one memory used to stored machine readable programs and at least one processor used invoke the machine readable programs to execute the method provided in the first embodiment, any possible implementation mode in the first embodiment, the second embodiment or any possible implementation mode in the second embodiment.

In a seventh embodiment, a machine readable storage medium in which machine readable instructions are stored is provided. When the machine readable instructions are executed by at least one processor, the at least one processor executes the method provided in the first embodiment, any possible implementation mode in the first embodiment, the second embodiment or any possible implementation mode in the second embodiment.

As mentioned previously, a mathematical modeling method based on digital signals is usually used to monitor and diagnose faults of a numerical control machine tool at present. However, such a method is suitable for certain and regular digital signals. However, in view of the uncertainty of signals and/or information generated by a numerical control machine tool, it is difficult to efficiently diagnose faults by using the traditional method.

In the embodiments of the present invention, after returning the diagnosis result to the user, the fault diagnosis apparatus receives feedback of the user on the fault diagnosis result and adjusts the fault diagnosis policy according to the feedback. Thus, the accuracy of the fault diagnosis is improved.

When providing feedback on the fault diagnosis result, the user can indicate whether the fault has been cleared. In addition, if the fault diagnosis result indicates that the fault has been cleared, the user can feed back the fault actually causing the fault symptom to be diagnosed. In this way, when adjusting the fault diagnosis policy, the fault diagnosis apparatus can increase the probability of the fault actually causing the fault symptom to be diagnosed. If the fault diagnosis result indicates that the fault has not been cleared, the fault diagnosis apparatus can send the fault symptom to be diagnosed to a fault diagnosis expert, and the fault diagnosis apparatus can send the fault diagnosis result of the fault diagnosis expert to the user and receive the feedback of the user. If the feedback of the user indicates that the fault has been cleared, the fault diagnosis apparatus updates the fault diagnosis information database according to the fault diagnosis result of the fault diagnosis expert, for example, adds the association between the fault symptom to be diagnosed and the fault fed back by the user to actually cause the fault symptom to the fault diagnosis information database. In this way, the fault diagnosis policy is adjusted according to the feedback of the user and the fault diagnosis information database is updated. On the one hand, the accuracy of the current fault diagnosis is satisfied. On the other hand, since the fault diagnosis information database is updated, the diagnosis of the same fault symptom in future can directly be based on the fault diagnosis information database. Thus the dependency on a fault diagnosis expert is greatly reduced and the fault diagnosis efficiency is improved.

The user can enter a fault symptom to be diagnosed or select a fault symptom to be diagnosed from the fault symptom list provided by the fault diagnosis apparatus. If the user enters a fault symptom to be diagnosed, the fault diagnosis apparatus can send the fault symptom to be diagnosed to a fault diagnosis expert and return the fault diagnosis result of the fault diagnosis expert to the user. If the user selects a fault symptom to be diagnosed from the known fault symptom list provided by the fault diagnosis apparatus, the fault diagnosis apparatus can diagnose the fault based on a fault diagnosis information database and will also return the fault diagnosis result to the user. In this way, the fault diagnosis apparatus can diagnose the fault for a fault symptom, no matter whether the fault symptom to be diagnosed has appeared before or appeared for the first time.

The following describes in detail the embodiments of the present invention in combination with the drawings.

Figure 2:
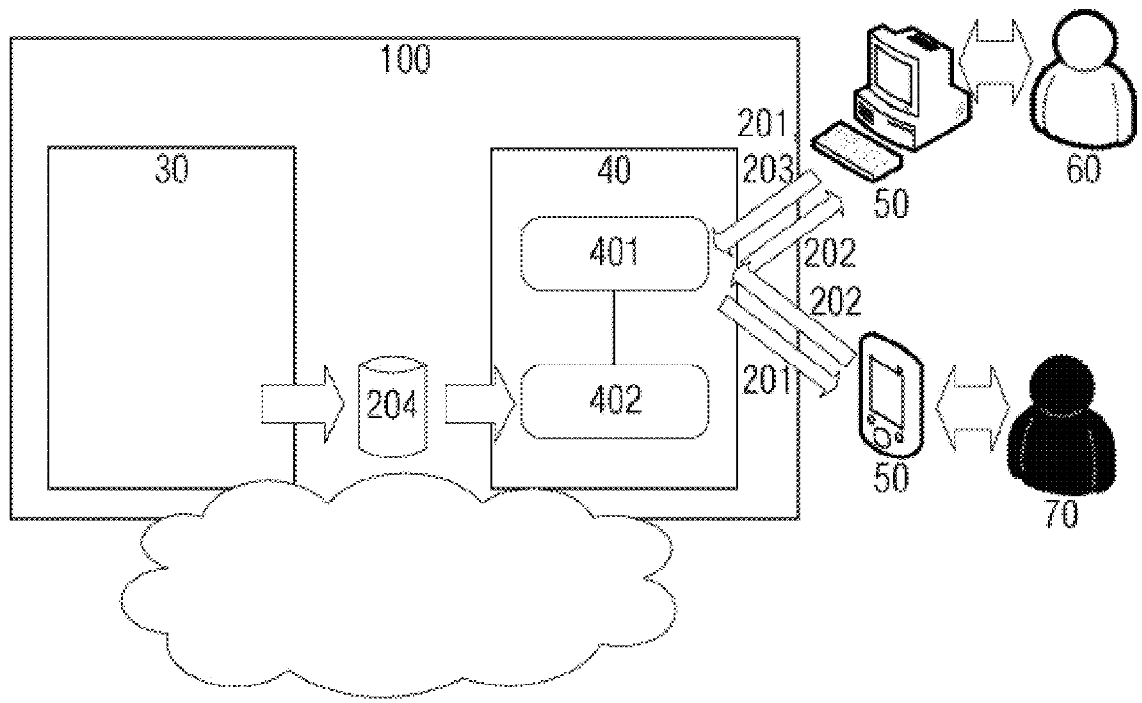
FIG. 2 is a schematic diagram of the fault diagnosis system provided in the embodiments of the present invention.

FIG. 2 is a schematic diagram of the fault diagnosis system provided in the embodiments of the present invention. As shown FIG. 2, the fault diagnosis system 100 comprises a fault diagnosis apparatus 40 used to diagnose faults for a numerical control machine tool.

The fault diagnosis apparatus 40 can diagnose faults based on a fault diagnosis information database 204. Therefore, the fault diagnosis information database can be considered as a part of the fault diagnosis system 100, or can be considered independent of the fault diagnosis system 100. The fault diagnosis information database 204 contains at least one fault symptom and the association between each fault symptom and at least one possible fault causing the fault symptom. If a fault of all possible faults causing a fault symptom is a starting node on the whole fault propagation path, that is to say, the fault is not caused by other faults, the fault can be considered as a possible root cause for the fault symptom. Alternatively, the fault diagnosis information database 204 can be organized and presented in the form of big data. In addition, the fault diagnosis information database can be deployed on a cloud to provide abundant and accurate fault information for the fault diagnosis apparatus 40.

The fault diagnosis information database 204 can be generated by a fault diagnosis information database generating device 30. The fault diagnosis information database generating device 30 can be considered as a part of the fault diagnosis system 100 or can be considered independent of the fault diagnosis system 100. For the principle of the generation of the fault diagnosis information database 204 by the fault diagnosis information database generating device 30, see FIGS. 10 and 11 and the corresponding description.

The fault diagnosis apparatus 40 can comprise a user interface module 401 and a fault diagnosis module 402. The user interface module 401 can be used to interact with a user terminal to receive a fault symptom 201 to be diagnosed which is entered by a user 60 or selected by the user from the fault symptom list 205. The user interface module 401 can be further used to interact with the user terminal 50 to return the fault diagnosis result 202 to the user 60. In addition, the user interface module 401 can be further used to interact with the user terminal 50 to receive the feedback 203 of the user on the fault diagnosis result 202.

In addition, the user interface module 401 can be further used to interact with a user terminal 50 to send a fault symptom 201 to be diagnosed to a fault diagnosis expert 70 and receive the fault diagnosis result 202 of the fault symptom 201 to be diagnosed from the fault diagnosis expert 70.

The fault diagnosis module 402 in the fault diagnosis apparatus 40 can diagnose the fault for the fault symptom 201 to be diagnosed based on a fault diagnosis information database 204, or send the fault symptom 201 to be diagnosed to a fault diagnosis expert 70 through the user interface module 401 and receive the fault diagnosis result 202 of the fault diagnosis expert 70.

In addition, the fault diagnosis module 402 can further adjust the diagnosis policy for the fault symptom 201 to be diagnosed according to the feedback 203 of the user 60, and alternatively update the fault diagnosis information database 204.

Alternatively, the fault diagnosis apparatus 40 can also be deployed on a cloud. In this way, the user 60 can conveniently access the fault diagnosis apparatus 40 for a fault diagnosis through the user terminal 50 anywhere at any time. The user terminal 50 can be a personal computer (PC), a mobile terminal or a tablet computer.

Figure 3:
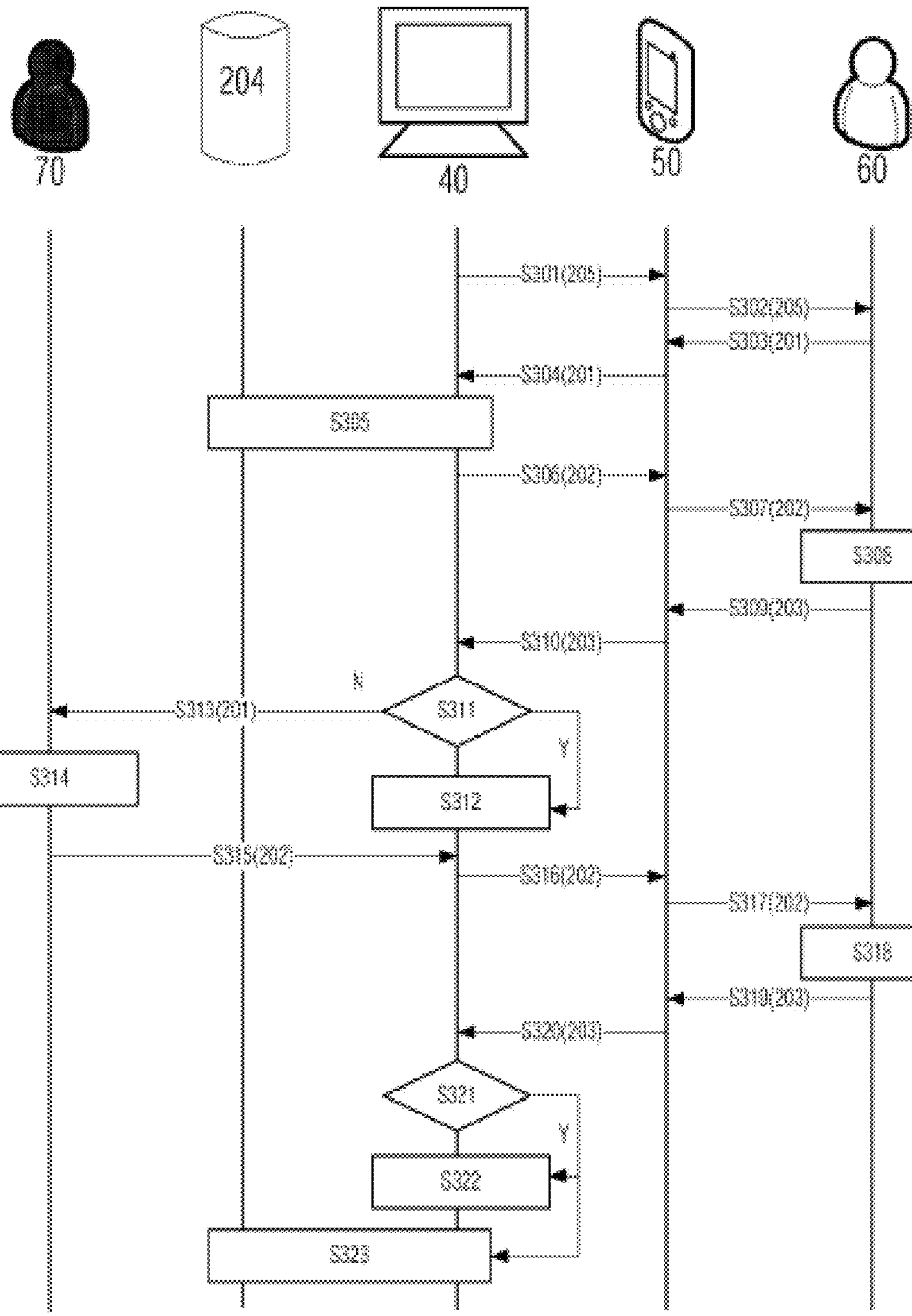
FIG. 3 is a flowchart of the fault diagnosis method provided in the embodiments of the present invention.

FIG. 3 is a flowchart of the fault diagnosis method provided in the embodiments of the present invention. As shown in FIG. 3, the method can comprise the following steps:

S301: The fault diagnosis apparatus 40 sends a fault symptom list 205 to the user terminal 50.

S302: The user terminal 50 presents the fault symptom list 205 to the user 60.

S303: The user terminal 50 receives a fault symptom 201 to be diagnosed which is selected by the user 60 from the fault symptom list 205.

S304: The fault diagnosis apparatus 40 receives the fault symptom 201 selected by the user 60 of the user terminal 50 from the fault symptom list.

S305: The fault diagnosis apparatus 40 diagnoses the fault for the fault symptom 201 to be diagnosed based on the fault diagnosis information database 204.

S306: The fault diagnosis apparatus 40 returns the fault diagnosis result 202 to the user terminal 50.

S307: The user terminal 50 presents the fault diagnosis result 202 to the user 60.

S308: The user 60 clears the fault according to the fault diagnosis result 202.

S309: The user 60 enters the feedback 203 on the fault diagnosis result 202 on the user terminal 50.

S310: The user terminal 50 sends the feedback 203 of the user 60 on the fault diagnosis result 202 to the fault diagnosis apparatus 40.

S311: The fault diagnosis apparatus 40 determines whether the fault has been cleared according to the feedback 203. If the feedback 203 indicates that the fault has been cleared (Y), the fault diagnosis apparatus performs step S312. If the feedback 203 indicates that the fault has not been cleared (N), the fault diagnosis apparatus performs step S313.

S312: The fault diagnosis apparatus 40 adjusts the diagnosis policy for the fault symptom 201 to be diagnosed. Wherein, the fault diagnosis result 202 contains at least one possible fault causing the fault symptom 201 to be diagnosed and indicative information on the probability of occurrence of each possible fault (for example, indicating that the probability of occurrence of a fault is high, medium or low, or indicating the probability of occurrence of a specific fault); the feedback 203 of the user 60 on the fault diagnosis result 202 further contains the fault actually causing the fault symptom 201 to be diagnosed; when adjusting the diagnosis policy for the fault symptom 201 to be diagnosed, the fault diagnosis apparatus 40 can increase the probability of the fault actually causing the fault symptom 201 to be diagnosed. Accordingly, the fault diagnosis apparatus can reduce the probabilities of other faults causing the fault symptom 201 to be diagnosed.

S313: The fault diagnosis apparatus 40 sends the fault symptom 201 to be diagnosed to a fault diagnosis expert 70.

S314: The fault diagnosis expert 70 diagnoses the fault for the fault symptom 201 to be diagnosed.

S315: The fault diagnosis apparatus 40 receives the fault diagnosis result 202 from the fault diagnosis expert 70.

S316: The fault diagnosis apparatus 40 sends the fault diagnosis result 202 of the fault diagnosis expert 70 to the user terminal 50.

S317: The user terminal 50 presents the fault diagnosis result 202 of the fault diagnosis expert 70 to the user 60.

S318: The user 60 clears the fault according to the fault diagnosis result 202 of the fault diagnosis expert 70.

S319: The user 60 enters the feedback 203 on the fault diagnosis result 202 of the fault diagnosis expert 70 on the user terminal 50.

S320: The user terminal 50 sends the feedback 203 entered by the user 60 on the fault diagnosis result 202 in step S319 to the fault diagnosis apparatus 40.

S321: The fault diagnosis apparatus 40 determines whether the fault has been cleared according to the feedback 203 received in step S320; if the feedback 203 indicates that the fault has been cleared, the fault diagnosis apparatus 40 performs step S322, and otherwise the fault diagnosis apparatus resends the fault symptom 201 to be diagnosed to the fault diagnosis expert 70 for a fault diagnosis and steps S313 to S320 are repeated.

S322: The fault diagnosis apparatus 40 adjusts the diagnosis policy for the fault symptom 201 to be diagnosed, for example, assigns a probability to the fault actually causing the fault symptom 201 to be diagnosed to identify the probability of the fault which actually occurs among all faults that may cause the fault symptom 201 to be diagnosed.

S323: The fault diagnosis apparatus 40 updates the fault diagnosis information database 204 according to the fault diagnosis result 202 of the fault diagnosis expert 70, for example, adds an association between the fault symptom 201 to be diagnosed and the fault fed back by the user 60 to actually cause the fault symptom 201 to the fault diagnosis information database 204).

Figure 4:
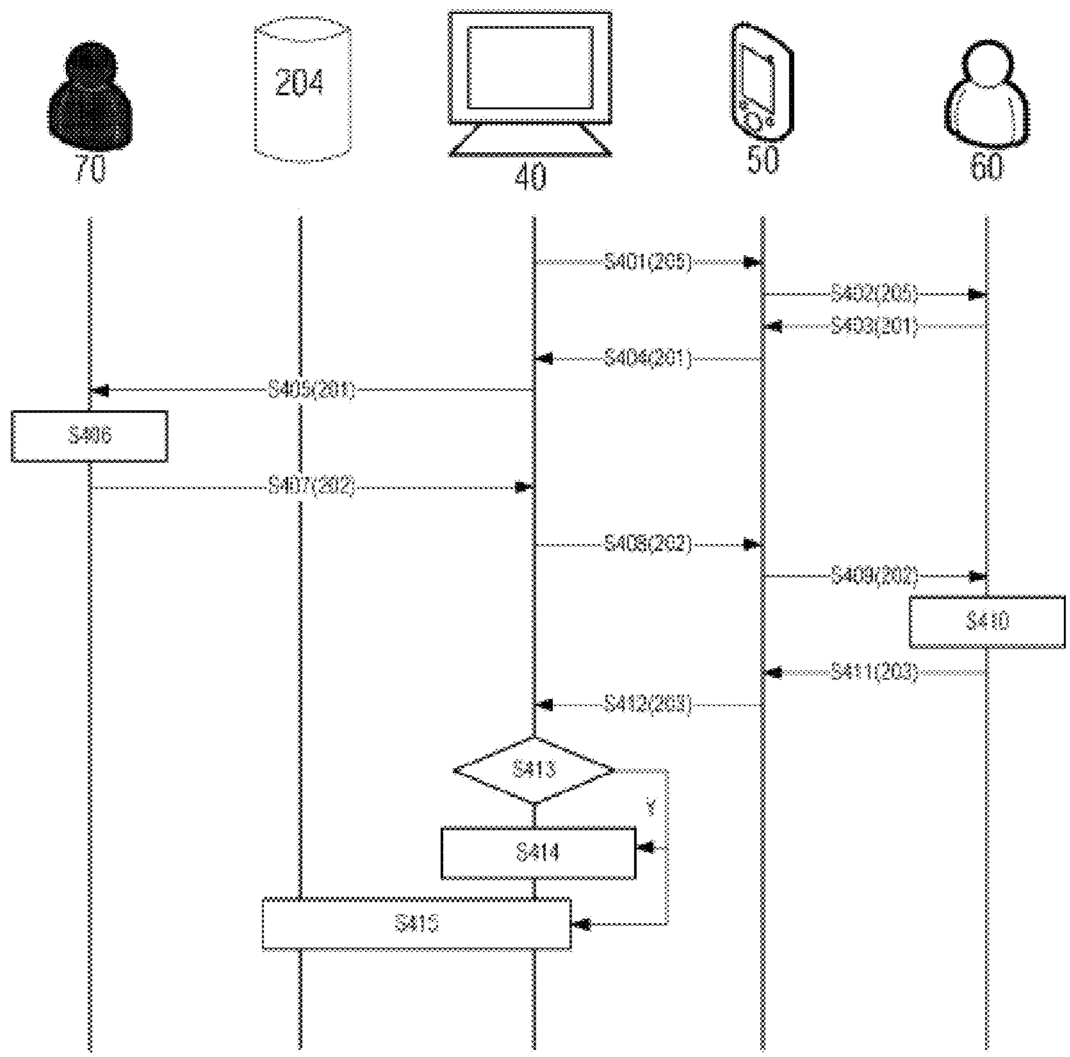
FIG. 4 is another flowchart of the fault diagnosis method provided in the embodiments of the present invention.

FIG. 4 is another flowchart of the fault diagnosis method provided in the embodiments of the present invention. In the flowchart in FIG. 4, which is different from the flowchart shown in FIG. 3, the fault symptom 201 to be diagnosed is not in the fault symptom list 205 provided by the fault diagnosis apparatus 40, and the fault symptom 201 to be diagnosed is manually entered by the user 60. As shown in FIG. 4, the flow can comprise the following steps:

S401: The fault diagnosis apparatus 40 sends a fault symptom list 205 to the user terminal 50.

S402: The user terminal 50 presents the fault symptom list 205 to the user 60.

S403: The user terminal 50 receives the fault symptom 201 to be diagnosed from the user 60.

S404: The fault diagnosis apparatus 40 receives the fault symptom 201 from the user 60 of the user terminal 50.

S405: The fault diagnosis apparatus 40 sends the fault symptom 201 to be diagnosed to a fault diagnosis expert 70.

S406: The fault diagnosis expert 70 diagnoses the fault for the fault symptom 201 to be diagnosed.

S407: The fault diagnosis apparatus 40 receives the fault diagnosis result 202 from the fault diagnosis expert 70.

S408: The fault diagnosis apparatus 40 sends the fault diagnosis result 202 to the user terminal 50.

S409: The user terminal 50 presents the fault diagnosis result 202 to the user 60.

S410: The user 60 clears the fault according to the fault diagnosis result 202.

S411: The user 60 enters the feedback 203 on the fault diagnosis result 202 on the user terminal 50.

S412: The user terminal 50 sends the feedback 203 of the user 60 on the fault diagnosis result 202 to the fault diagnosis apparatus 40.

S413: The fault diagnosis apparatus 40 determines whether the fault has been cleared according to the feedback 203; if the feedback 203 indicates that the fault has been cleared, the fault diagnosis apparatus performs step S414, and otherwise the fault diagnosis apparatus resends the fault symptom 201 to be diagnosed to the fault diagnosis expert 70 for a fault diagnosis and steps S405 to S412 are repeated.

S414: The fault diagnosis apparatus adjusts the diagnosis policy for the fault symptom 201 to be diagnosed. For example, the fault diagnosis apparatus assigns a probability to the fault actually causing the fault symptom 201 to be diagnosed to identify the probability of the fault which actually occurs among all faults that may cause the fault symptom 201 to be diagnosed.

S415: The fault diagnosis apparatus updates the fault diagnosis information database 204 according to the fault diagnosis result 202 of the fault diagnosis expert 70. For example, the fault diagnosis apparatus adds an association between the fault symptom 201 to be diagnosed and the fault fed back by the user 60 to actually cause the fault symptom 201 to the fault diagnosis information database 204.

Figure 5:
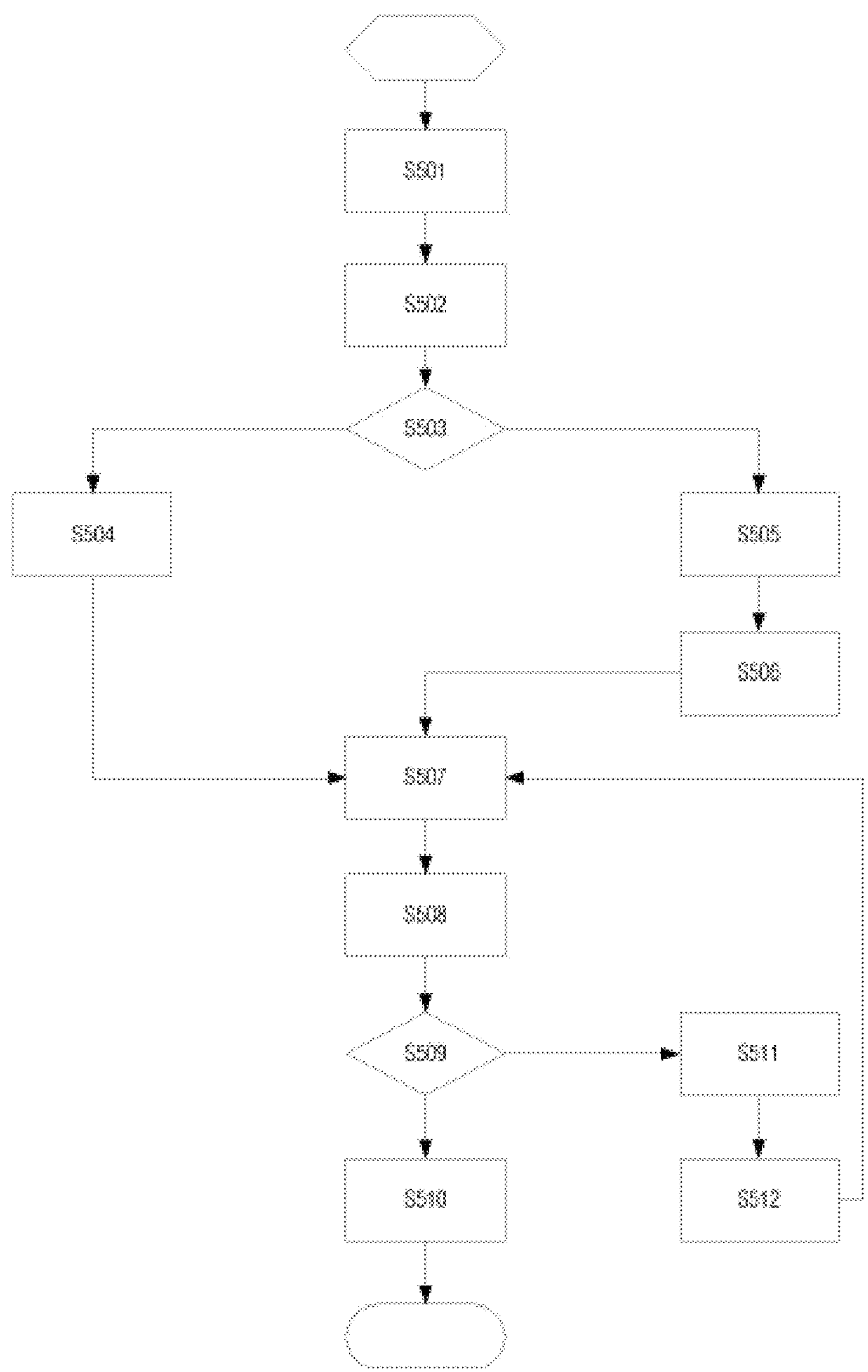
FIG. 5 is a flowchart of a fault diagnosis performed by the fault diagnosis apparatus provided in the embodiments of the present invention.

FIG. 5 is a flowchart of a fault diagnosis performed by the fault diagnosis apparatus 40 provided in the embodiments of the present invention. As shown in FIG. 5, the flow can comprise the following steps:

S501: The fault diagnosis apparatus sends a fault symptom list 205 to the user terminal 50.

S502: The fault diagnosis apparatus receives the fault symptom 201 to be diagnosed from the user terminal 50.

S503: The fault diagnosis apparatus determines whether the fault symptom 201 to be diagnosed is selected from the fault symptom list 205 or entered by the user 60. If the fault symptom is selected from the fault symptom list 205, the fault diagnosis apparatus performs step S504, and if the fault symptom is entered by the user 60, the fault diagnosis apparatus performs steps S505 and S506.

S504: The fault diagnosis apparatus diagnoses the fault for the fault symptom 201 to be diagnosed based on the fault diagnosis information database 204.

S505: The fault diagnosis apparatus sends the fault symptom 201 to be diagnosed to a fault diagnosis expert 70.

S506: The fault diagnosis apparatus receives the fault diagnosis result 202 from the fault diagnosis expert 70.

S507: The fault diagnosis apparatus sends the fault diagnosis result 202 to the user terminal 50.

S508: The fault diagnosis apparatus receives the feedback 203 on the fault diagnosis result 202 from the user 60 of the user terminal 50.

S509: The fault diagnosis apparatus 40 determines whether the fault has been cleared according to the feedback 203. If the fault has been cleared, the fault diagnosis apparatus performs step S510, and if the fault has not been cleared, the fault diagnosis apparatus performs step S511.

S510: The fault diagnosis apparatus adjusts the diagnosis policy for the fault symptom 201 to be diagnosed (updates the fault diagnosis information database 204).

S511: The fault diagnosis apparatus sends the feedback 203 of the user 60 on the fault diagnosis result 202 to the fault diagnosis expert 70.

S512: The fault diagnosis apparatus receives the fault diagnosis result 202 from the fault diagnosis expert 70.

Figure 6:
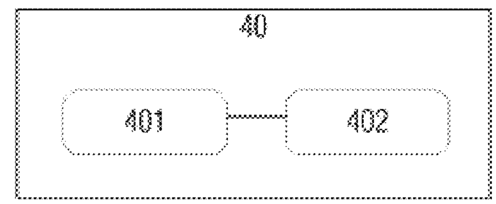
FIG. 6 is one schematic diagram of the fault diagnosis apparatus provided in the embodiments of the present invention.

FIG. 6 is one schematic diagram of the fault diagnosis apparatus 40 provided in the embodiments of the present invention. As shown in FIG. 6, the fault diagnosis apparatus 40 can comprise:

a user interface module 401, used to receive a fault symptom 201 to be diagnosed from a user 60 of a user terminal 50, and a fault diagnosis module 402, used to diagnose the fault for the fault symptom 201 to be diagnosed, wherein the user interface module 401 is further used to return a fault diagnosis result 202 to the user terminal 50 and receive the feedback 203 on the fault diagnosis result 202 from the user 60 of the user terminal 50, and the fault diagnosis module 402 is further used to adjust the diagnosis policy for the fault symptom 201 to be diagnosed according to the fault diagnosis result 202 if the feedback 203 of the user 60 on the fault diagnosis result 202 indicates that the fault has been cleared.

Alternatively, when diagnosing the fault for the fault symptom 201 to be diagnosed, the fault diagnosis module 402 is specifically used to diagnose the fault for the fault symptom 201 to be diagnosed based on a fault diagnosis information database 204, wherein the diagnosis information database 204 contains at least one fault symptom and the association between each fault symptom and at least one possible fault causing the fault symptom;

the fault diagnosis module 402 is further used to send the fault symptom 201 to be diagnosed to a fault diagnosis expert 70 for a fault diagnosis and receive the fault diagnosis result 202 returned by the fault diagnosis expert 70 if the feedback 203 of the user 60 on the fault diagnosis result 202 indicates that the fault has not been cleared;

the user interface module 401 is further used to return the fault diagnosis result 202 of the fault diagnosis expert 70 to the user terminal 50 and receive the feedback 203 on the fault diagnosis result 202 of the fault diagnosis expert 70 from the user 60 of the user terminal 50;

the fault diagnosis module 402 is further used to adjust the diagnosis policy for the fault symptom 201 to be diagnosed if the feedback 203 of the user 60 on the fault diagnosis result 202 of the fault diagnosis expert 70 indicates that the fault has been cleared, and update the fault diagnosis information database 204 according to the fault diagnosis result 202 of the fault diagnosis expert 70 if the feedback 203 of the user 60 on the fault diagnosis result 202 of the fault diagnosis expert 70 indicates that the fault has been cleared.

Alternatively, the fault diagnosis result 202 of the fault diagnosis expert 70 contains at least one possible fault causing the fault symptom 201 to be diagnosed, the feedback 203 of the user 60 on the fault diagnosis result 202 of the fault diagnosis expert 70 indicates that the fault has been cleared, and the feedback 203 of the user 60 on the fault diagnosis result 202 of the fault diagnosis expert 70 further contains the fault actually causing the fault symptom 201 to be diagnosed; when updating the fault diagnosis information database 204 according to the fault diagnosis result 202 of the fault diagnosis expert 70, the fault diagnosis module 402 is specifically used to add an association between the fault symptom 201 to be diagnosed and the fault fed back by the user 60 to actually cause the fault symptom 201 to the fault diagnosis information database 204.

Alternatively, the fault diagnosis result 202 contains at least one possible fault causing the fault symptom 201 to be diagnosed and indicative information on the probability of occurrence of each possible fault; the feedback of the user 60 on the fault diagnosis result 202 indicates that the fault has been cleared, and the feedback of the user 60 on the fault diagnosis result 202 further contains the fault actually causing the fault symptom 201 to be diagnosed; when adjusting the diagnosis policy for the fault symptom 201 to be diagnosed according to the fault diagnosis result 202, the fault diagnosis module 402 is specifically used to increase the probability of the fault actually causing the fault symptom 201 to be diagnosed.

Alternatively, the user interface module 401 is further used to send a fault symptom list 205 to the user terminal 50 before receiving a fault symptom 201 to be diagnosed from a user 60 of the user terminal 50, wherein the fault symptom list 205 contains at least one fault symptom; when receiving the fault symptom 201 to be diagnosed from the user 60 of the user terminal 50, the user interface module 401 is specifically used to receive the fault symptom 201 selected by the user 60 of the user terminal 50 from the fault symptom list 205; when diagnosing the fault for the fault symptom 201 to be diagnosed, the fault diagnosis module 402 is specifically used to diagnose the fault for the fault symptom 201 based on a fault diagnosis information database 204, wherein the diagnosis information database 204 contains at least one fault symptom and the association between each fault symptom and at least one possible fault causing the fault symptom; or when receiving the fault symptom 201 to be diagnosed from a user 60 of a user terminal 50, the user interface module 401 is specifically used to receive a semantic description of the fault symptom 201 to be diagnosed from the user 50 of the user terminal 60; when diagnosing the fault for the fault symptom 201 to be diagnosed, the fault diagnosis module 402 is specifically used to receive the diagnosis result of a fault diagnosis expert 70 on the fault symptom 201 to be diagnosed.

For other optional implementation modes of the fault diagnosis apparatus 40 shown in FIG. 6, see the implementation of the fault diagnosis apparatus 40 in FIGS. 2 to 5, wherein the user interface module 401 is used to interact with the user terminal 50 and the fault diagnosis module 402 is used to diagnose the fault, access the fault diagnosis information database 204 and adjust the fault diagnosis policy.

Figure 7:
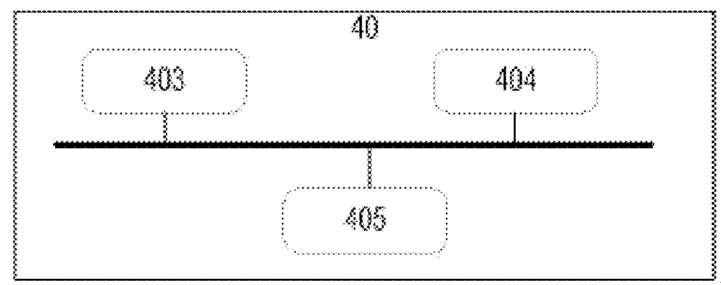
FIG. 7 is another schematic diagram of the fault diagnosis apparatus provided in the embodiments of the present invention.

FIG. 7 is another schematic diagram of the fault diagnosis apparatus 40 provided in the embodiments of the present invention. The fault diagnosis apparatus 40 shown in FIG. 7 can be considered as a hardware implementation mode of the fault diagnosis apparatus 40 shown in FIG. 6. Wherein, at least one memory 404 is used to store a machine readable program and at least one processor 403 is used to invoke the machine readable program to execute the method executed by the fault diagnosis apparatus 40 in the previously-mentioned flows. The user interface module 401 and the fault diagnosis module 402 in FIG. 6 can be considered as program modules or software modules stored in the memory 404, and after being invoked by the processor 403, the modules execute the method executed by the fault diagnosis apparatus 40 in the previously-mentioned flows.

The fault diagnosis apparatus 40 shown in FIG. 7 can further comprise a communication interface 405 used to access the fault diagnosis information database 204 and interact with the user terminal 50. The fault diagnosis apparatus 40 shown in FIGS. 6 and 7 can be deployed on a cloud. In this case, at least one memory 404 can be a memory on the cloud and at least one processor 403 can also be a virtual processing unit, for example, a virtual machine, on the cloud.

Figure 8:
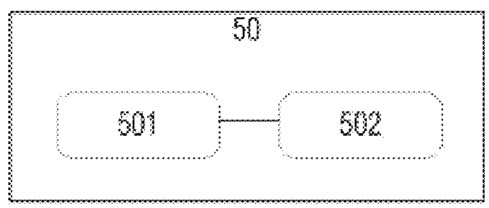
FIG. 8 is a schematic diagram of the user terminal provided in the embodiments of the present invention.

FIG. 8 is a schematic diagram of the user terminal 50 provided in the embodiments of the present invention. As shown in FIG. 8, the user terminal 50 can comprise:

a user interface module 501, used to receive a fault symptom 201 to be diagnosed from a user 60, and a communication module 502, used to send the fault symptom 201 to be diagnosed to a fault diagnosis apparatus 40 for a fault diagnosis and receive a fault diagnosis result 202 of the fault symptom 201 to be diagnosed from the fault diagnosis apparatus 40, wherein the user interface module 501 is further used to provide the fault diagnosis result 202 for the user 60 and receive the feedback 203 of the user 60 on the fault diagnosis result 202, and the communication module 502 is further used to send the feedback 204 of the user 60 on the fault diagnosis result 202 to the fault diagnosis apparatus 40.

Alternatively, when receiving the feedback 203 of the user 60 on the fault diagnosis result 202, the user interface module 501 is further used to receive the fault fed back by the user 60 to actually cause the fault symptom 201.

For other optional implementation modes of the user terminal shown in FIG. 8, see the implementation of the user terminal 50 in FIGS. 2 to 5, wherein the user interface module 501 is used to interact with the user 60 and the communication module 502 is used to interact with the fault diagnosis apparatus 40.

Figure 9:
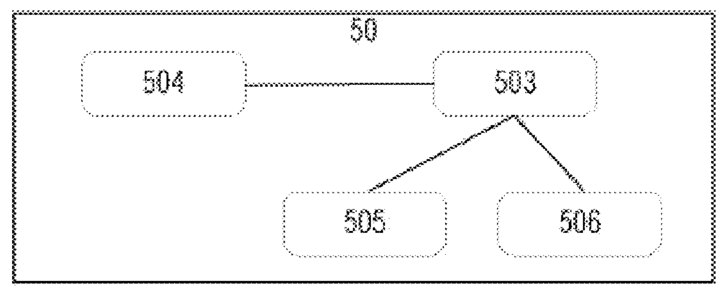
FIG. 9 is another schematic diagram of the user terminal provided in the embodiments of the present invention.

FIG. 9 is another schematic diagram of the user terminal 50 provided in the embodiments of the present invention. The user terminal 50 shown in FIG. 9 can be considered as a hardware implementation mode of the user terminal 50 shown in FIG. 8. Wherein, at least one memory 504 is used to store a machine readable program and at least one processor 503 is used to invoke the machine readable program to execute the method executed by the user terminal 50 in the previously-mentioned flows. The user interface module 501 and the communication module 502 in FIG. 8 can be considered as program modules or software modules stored in the memory 504, and after being invoked by the processor 503, the modules execute the method executed by the user terminal 50 in the previously-mentioned flows.

The user terminal shown in FIG. 9 can further comprise at least one display 505 used to display information to the user 60 or the fault diagnosis expert 70. In addition, the user terminal can further comprise a communication interface 506 used to communicate with the fault diagnosis apparatus 40.

Figure 10:
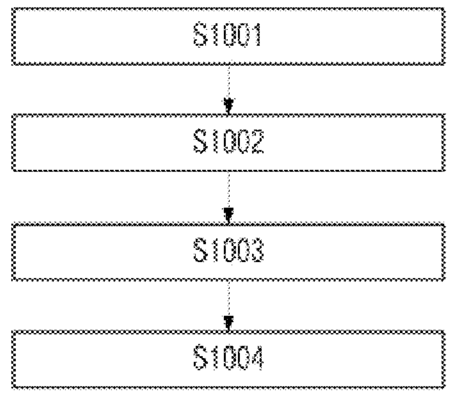
FIG. 10 is a flowchart of the generation of a fault diagnosis information database by the fault diagnosis information database generating device in the embodiments of the present invention.

FIG. 10 is a flowchart of the generation of a fault diagnosis information database by the fault diagnosis information database generating device in the embodiments of the present invention.

As shown in FIG. 2, the method can comprise the following steps:

S1001: Set fault conditions.

S1002: Run the simulation model of a numerical control machine tool.

S1003: Trace back faults.

S1004: Generate a fault diagnosis information database.

In step S1001, at least one fault condition 1102 is set for the numerical control machine tool 10. For example, the zero current of the servo motor 103 of the numerical control machine tool 10 is considered as one fault condition 1102.

Alternatively, the at least one fault condition 1102 can relate to all components, for example, PLC101, servo drive 102, servo motor 103, coupler 104, bearings 105, ball screw pair 106 and encoder 107 in FIG. 1, of the numerical control machine tool 10. In this way, all components of the numerical control machine tool 10 can be traversed and more comprehensive faults will be generated.

Alternatively, each fault condition 1102 which is set relates to only one component of the numerical control machine tool 10.

Alternatively, among at least one fault condition 1102 which is set, each of a part or all of fault conditions 1102 relates to at least two components of the numerical control machine tool 10. For example, a total of 100 fault conditions 1102 are set and each of 50 fault conditions 1102 relates to at least two components of the numerical control machine tool 10. In this way, various practical fault scenarios are simulated and they are more flexible than the traditional fault diagnosis information database generated based on the record of history of faults and expert experience, and more faults are covered.

Alternatively, when fault conditions 1102 are set, all possible fault conditions can be traversed to simulate all faults that may occur.

In step S1002, each simulation model of the numerical control machine tool 10 is run under each fault condition 1102 to generate a fault 1103 and at least one fault symptom 1104 of the fault 1103 is recorded. Wherein, one fault may cause a plurality of fault symptoms. In step S1002, all fault symptoms 1104 of the fault 1103 or a part of fault symptoms 1104 of the fault 1103 can be recorded.

For example, a fault condition 1102 is set as follows: the current of the servo motor 103 is 0. The simulation model of the numerical control machine tool 10 is run under the fault condition 1102 and the generated fault 1103 is that the servo motor 103 outputs no current. The fault symptom 1104 of the fault is that the revolution of the nut in the ball screw pair 106 drops to 0. The fault symptom "the revolution of the nut in the ball screw pair 106 drops to 0" of the fault of the servo motor 103 is recorded in step S1002.

In step S1003, for each recorded fault symptom 1104, at least one possible fault 1103 causing the fault symptom 1104 is traced back to establish the association between the fault symptom 1104 and at least one possible fault 1103 causing the fault symptom 1104.

Figure 11:
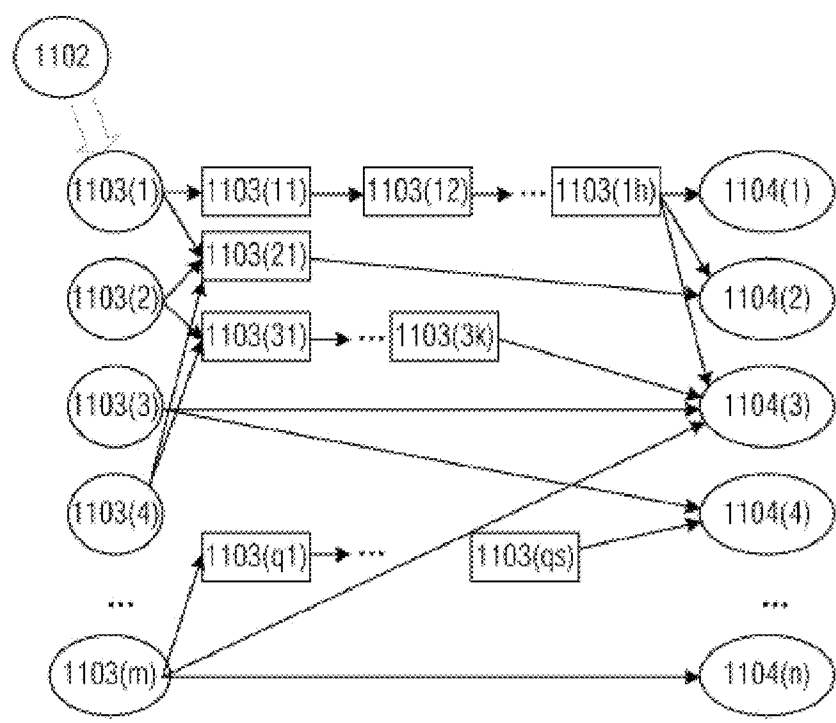
FIG. 11 is a schematic diagram of the fault diagnosis information database generated in the embodiments of the present invention.

Wherein, all possible faults 1103 causing the fault symptom 1104 can be traced back, or a portion of possible faults 1103 causing the fault symptom 1104 can be traced back. FIG. 11 shows the established association between the fault symptom 1104 and the fault 1103. For the fault symptom 1104(2), the fault symptom 1104 can be caused by the fault 1103(1*h*), the fault 1103(1*h*) can directly or indirectly be caused by the fault 1103(12), the fault 1103(12) is caused by the fault 1103(11), and the fault 1103(11) is caused by the fault 1103(1). In addition, the fault symptom 1104(2) may also be caused by the fault 1103(21), and the fault 1103 (21) may be caused by the fault 1103(1), the fault 1103 (2) or the fault 1103(4).

In step S1004, a fault diagnosis information database 204 of the numerical control machine tool 10 is generated according to at least one association established in step S1003.

Alternatively, the fault diagnosis information database 204 of the numerical control machine tool 10 can be generated according to all or a part of the established associations. The generated fault diagnosis information database 204 can be realized in a plurality of ways, for example, the fault propagation model shown in FIG. 3. Wherein, 1102 represents an injected fault condition. 1103(1) to 1103(*m*) represent m faults, wherein m is a positive integer. One fault may cause another fault. In FIGS. 10, 1103(11) to 1103(*q*1), 1103(12) to 1103(1*h*), 1103(3*k*), 1103(*qs*), and 1103(11) to 1103(*q*1) are faults caused by one or more of m faults 1103(1) to 1103(*m*), wherein q, h, k and s are positive integers. 1104(1) to 1104(*n*) represent n fault symptoms, wherein n is a positive integer. The process from a fault symptom 1104 to a fault 1103 is called a reverse fault propagation path of the fault symptom 1104. For example, a reverse fault propagation path from the fault symptom 1104(2) to the fault 1103(1) can be 1104(2)->1103(21)->1103(2), which means that the fault symptom 1104 (2) is caused by the fault 1103(21) and the fault 1103(21) can be caused by the fault 1103(2). Therefore, for the situation where a fault propagation model is established, the association established in step S1003 is a reverse fault propagation path of a fault symptom 1104, and a fault propagation model is generated as a fault diagnosis information database 204 according to the reverse fault propagation path in step S1004.

The generated fault diagnosis information database 204 can also contain fault cases. For example, for the fault symptom 1104(2), the fault diagnosis information database contains four fault cases, which respectively are:

Fault case 1. 1104(2)->1103(21)->1103(1), indicating that the fault symptom 1104(2) is caused by the fault 1103(21) and the fault 1103(21) can be caused by the fault 1103(1).

Fault case 2. 1104(2)->1103(21)->1103(2), indicating that the fault symptom 1104(2) is caused by the fault 1103(21) and the fault 1103(21) can be caused by the fault 1103(2).

Fault case 3. 1104(2)->1103(21)->1103(4), indicating that the fault symptom 1104(2) is caused by the fault 1103(21) and the fault 1103(21) can be caused by the fault 1103(4).

Fault case 4. 1104(2)->1103(1*h*)->1103(12)->1103(11)->1103(1), indicating that the fault symptom 1104(2) is caused by the fault 1103(1*h*), the fault 1103 (1*h*) is caused by the fault 1103 (12), the fault 1103 (12) is caused by the fault 1103(11), and the fault 1103 (11) is caused by the fault 1103(1).

In addition, the generated fault diagnosis information database 204 can be expressed by use of a fault tree, which will not be described here.

In addition, the semantic description 1105 of each fault symptom 1104 can be set and recorded in the first fault diagnosis information database 204, and the semantic description 1106 of each fault 1103 can be set and recorded in the first fault diagnosis information database 204. In this way, at the time of a fault diagnosis, it is very convenient to determine the corresponding fault symptom according to the semantic description of the fault symptom entered by the user, then determine the possible fault according to the fault symptom, and finally return the semantic description of the determined fault to the user. The semantic descriptions improve the availability of the fault diagnosis information database, help the user to understand the faults and are more friendly to the user.

For example, the corresponding semantic description of the fault 1103 "the servo motor 103 outputs no current" is "the servo motor is faulty", and the corresponding semantic description of the fault symptom 1104 "the revolution of the nut in the ball screw pair 106 drops to 0" is "the nut in the ball screw pair 106 stays still".

Alternatively, other simulation models of the numerical control machine tool 10 can be run under each fault condition 1102 of at least one fault condition 1102 set in step S1001 to generate the fault diagnosis information database 204. Since the simulation effects of different simulation models on a numerical control machine tool 10 are different, the information in the fault diagnosis information databases 204 generated by use of different simulation models is not completely the same, and the information can be mutually corrected to generate a fault diagnosis information database 204 containing comprehensive and accurate information.

The generated fault diagnosis information database 204 can be organized and presented in the form of big data. In addition, the fault diagnosis information database can be deployed on a cloud to provide abundant and accurate fault information for the fault diagnosis apparatus 40.

The faults in the embodiments of the present invention can be considered as the faults of one or more components, instead of the faults caused by the faults of other components. For example, for the feed system of the previously-mentioned numerical control machine tool 10, the PLC is controlled by the computer program in the encoder, the servo drive drives the servo motor to rotate, and then the servo motor drives the nut in the ball screw pair to rotate through the coupler and the bearings. The fault symptom of the fault which currently occurs is that the revolution of the nut in the ball screw pair drops to 0. The root cause for the fault symptom is that the servo motor is faulty. Since the fault of the servo motor causes the bearings to stop rotating, the nut in the ball screw pair will not be driven to rotate. However, the fault symptom is not caused by a bearing fault. The root cause, in other words, the fault which actually occurs is that the servo motor is faulty. If the servo motor is not faulty but a mechanical fault occurs to the bearings so that the nut cannot rotate, the fault symptom is also that the revolution of the nut in the ball screw pair drops to 0. However, the root cause is a bearing fault, instead of a servo motor fault.

Therefore, with this in mind, a fault in the embodiments of the present invention can also be called the root cause for a specific fault occurring to a numerical control machine tool.

On the basis of the same technical conception, the embodiments of the present invention further provide a machine readable medium, on which machine readable instructions used to let a machine execute the previously mentioned methods are stored. In particular, a system or device equipped with the machine readable medium is provided, software program codes realizing the function in any of the above-mentioned embodiments are stored on the machine readable medium, and the computer (or central processing unit (CPU) or micro processor unit (MPU)) of the system or device reads and executes the program codes stored on the storage medium.

In this case, program code read from the storage medium can itself realize the function in any of the above-mentioned embodiments. Therefore, program code and the storage medium where program code are stored constitute a part of the embodiments of the present invention.

Embodiments of the storage medium used to provide program codes include a floppy disk, hard disk, magneto-optical disc, optical disc (for example, compact disc read-only memory (CD-ROM), compact disc—recordable (CD-R), compact disc—rewritable (CD-RW), digital versatile disc—read only memory (DVD-ROM), digital versatile disc—random access memory (DVD-RAM), digital versatile disc±rewritable (DVD±RW), magnetic tape, non-volatile memory card, read-only memory (ROM) and a cloud storage resource. Alternatively, program code can be downloaded from the server computer or cloud over a communication network.

In addition, it should clearly be understood that the function of any of the above-mentioned embodiments can be realized not only by executing the program code read out by a computer, but also by letting the operating system running on the computer complete a part or all of practical operations through program code based instructions.

In addition, it should be understood that the program code read out of a storage medium are written into a memory in an expansion board in a computer or are written into a memory in an expansion unit connected to the computer, and then the program code based instructions let the CPU installed on the expansion board or expansion unit execute a part or all of practical operations to realize the function of any of the above-mentioned embodiments.

It should be noted that not all steps or modules in the above-mentioned processes and structural diagrams of equipment are required, and some steps or modules can be ignored, depending on the actual requirements. The execution sequence of the steps is not fixed and may be adjusted as required. The equipment structures described in the above-mentioned embodiments can be physical structures or logical structures. That is to say, some modules may be realized by a physical entity, or some modules may be realized by a plurality of physical entities or may jointly be realized by some components in a plurality of self-contained equipment.

In the above-mentioned embodiments, hardware units can mechanically or electrically be realized. For example, a hardware unit can comprise a permanent dedicated circuit or logic (for example, special processor, FPGA, or ASIC) to complete the corresponding operations. A hardware unit can further comprise a programmable logic or circuit (for example, a general processor or other programmable processor) and can complete the corresponding operations through temporary software settings. The specific implementation mode (mechanical mode, or dedicated permanent circuit, or circuit which is temporarily set) can be determined on the basis of consideration of cost and time.

The present invention is disclosed and described in detail above in combination with the drawings and preferred embodiments. However, the present invention is not limited to the disclosed embodiments. On the basis of the plurality of above-mentioned embodiments, those skilled in the art would know that more embodiments of the present invention could be obtained by combining the code review means in the above-mentioned different embodiments, and all these embodiments should also fall within the scope of protection of the present invention.

The invention claimed is:

1. A fault diagnosis method for a numerical control machine tool, the method comprising:

sending a fault symptom list from a fault diagnosis apparatus to a user terminal, the fault symptom list including one or more fault symptoms;

receiving a first fault symptom to be diagnosed, from the user terminal, the first fault symptom being selected from the fault symptom list or being a semantic description of the first fault symptom;

determining a fault diagnosis result of a fault for the first fault symptom, wherein in response to the first fault symptom being selected from the fault symptom list, the determining includes diagnosing the fault for the first fault symptom based on a fault diagnosis information database, the fault diagnosis information database including at least one fault symptom and an association between each of the at least one fault symptom and at least one possible fault causing the at least one fault symptom, and in response to the first fault symptom being the semantic description of the first fault symptom, the determining includes obtaining the fault diagnosis result from a fault diagnosis expert;

returning the fault diagnosis result to the user terminal;

receiving feedback on the fault diagnosis result from the user terminal; and adjusting a diagnosis policy for the first fault symptom according to the fault diagnosis result in response to the feedback indicating that the fault for the first fault symptom has been cleared;

wherein the fault diagnosis result includes a probability of occurrence of a specific fault based on the diagnosis policy.

2. The method of claim 1, wherein the fault diagnosis result is determined by diagnosing the fault for the first fault symptom based on the fault diagnosis information database, and in response to the feedback indicating that the fault for the first fault symptom has not been cleared, the method includes sending the first fault symptom to the fault diagnosis expert for fault diagnosis;

receiving a subsequent fault diagnosis result from the fault diagnosis expert, returning the subsequent fault diagnosis result to the user terminal, receiving subsequent feedback on the subsequent fault diagnosis result from the user terminal, and in response to the subsequent feedback indicating that the fault for the first fault symptom has been cleared, updating the fault diagnosis information database according to the subsequent fault diagnosis result, and adjusting the diagnosis policy for the first fault symptom.

3. The method of claim 2, wherein the subsequent fault diagnosis result includes at least one possible fault causing the first fault symptom, the subsequent feedback indicates that the fault for the first fault symptom has been cleared, the subsequent feedback includes the fault actually causing the first fault symptom; and the updating the fault diagnosis information database according to the fault diagnosis result includes adding an association between the first fault symptom and the fault actually causing the first fault symptom to the fault diagnosis information database.

4. The method of claim 1, wherein the fault diagnosis result includes at least one possible fault causing the first fault symptom and information indicative of a probability of occurrence of each of the at least one possible fault, the feedback on the fault diagnosis result indicates that the fault for the first fault symptom has been cleared, the feedback on the fault diagnosis result includes the fault actually causing the first fault symptom, and the adjusting the diagnosis policy for the first fault symptom according to the fault diagnosis result includes increasing the probability of occurrence of the fault actually causing the first fault symptom.

5. A fault diagnosis apparatus for a numerical control machine tool, the fault diagnosis apparatus comprising:

at least one memory to store machine readable programs; and at least one processor to invoke the machine readable programs to at least send a fault symptom list to a user terminal, the fault symptom list including one or more fault symptoms, receive a first fault symptom to be diagnosed, from the user terminal, the first fault symptom being selected from the fault symptom list or being a semantic description of the first fault symptom, determine a fault diagnosis result of a fault for the first fault symptom, wherein in response to the first fault symptom being selected from the fault symptom list, the fault diagnosis result is determined by diagnosing the fault for the first fault symptom based on a fault diagnosis information database, the fault diagnosis information database including at least one fault symptom and an association between each of the at least one fault symptom and at least one possible fault causing the at least one fault symptom, and in response to the first fault symptom being the semantic description of the first fault symptom, the fault diagnosis result is determined by obtaining the fault diagnosis result from a fault diagnosis expert, return the fault diagnosis result to the user terminal, receive feedback on the fault diagnosis result from the user terminal, and adjust a diagnosis policy for the first fault symptom according to the fault diagnosis result in response to the feedback indicating that the fault for the first fault symptom has been cleared;

wherein the fault diagnosis result includes a probability of occurrence of a specific fault based on the diagnosis policy.

6. The apparatus of claim 5, wherein the fault diagnosis result is determined by diagnosing the fault for the first fault symptom based on the fault diagnosis information database, and in response to the feedback indicating that the fault for the first fault symptom has not been cleared, the at least one processor is further configured to send the first fault symptom to be diagnosed to the fault diagnosis expert, receive a subsequent fault diagnosis result from the fault diagnosis expert, return the subsequent fault diagnosis result to the user terminal, receive subsequent feedback on the subsequent fault diagnosis result from the user terminal, and in response to the subsequent feedback indicating that the fault for the first fault symptom has been cleared update the fault diagnosis information database according to the subsequent fault diagnosis result, and adjust the diagnosis policy for the first fault symptom.

7. The apparatus of claim 6, wherein the subsequent fault diagnosis result includes at least one possible fault causing the first fault symptom, the subsequent feedback indicates that the fault for the first fault symptom has been cleared, the subsequent feedback includes the fault actually causing the first fault symptom, and the at least one processor is configured to update the fault diagnosis information database according to the fault diagnosis result by adding an association between the first fault symptom and the fault actually causing the first fault symptom to the fault diagnosis information database.

8. The apparatus of claim 5, wherein the fault diagnosis result includes at least one possible fault causing the first fault symptom and information indicative of a probability of occurrence of each of the at least one possible fault, the feedback on the fault diagnosis result indicates that the fault for the first fault symptom has been cleared, the feedback on the fault diagnosis result includes the fault actually causing the first fault symptom, and the at least one processor is configured to adjust the diagnosis policy for the first fault symptom according to the fault diagnosis result by increasing the probability of occurrence of the specific fault actually causing the first fault symptom.

9. A non-transitory machine readable medium, storing machine readable instructions that, when executed by at least one processor, configures the at least one processor to perform a fault diagnosis method for a numerical control machine tool, the method comprising:

sending a fault symptom list from a fault diagnosis apparatus to a user terminal, the fault symptom list including one or more fault symptoms;

receiving a first fault symptom to be diagnosed, from the user terminal, the first fault symptom being selected from the fault symptom list or being a semantic description of the first fault symptom;

determining a fault diagnosis result of a fault for the first fault symptom, wherein in response to the first fault symptom being selected from the fault symptom list, the determining includes diagnosing the fault for the first fault symptom based on a fault diagnosis information database, the fault diagnosis information database including at least one fault symptom and an association between each of the at least one fault symptom and at least one possible fault causing the at least one fault symptom, and in response to the first fault symptom being the semantic description of the first fault symptom, the determining includes obtaining the fault diagnosis result from a fault diagnosis expert;

returning the fault diagnosis result to the user terminal;

receiving feedback on the fault diagnosis result from the user terminal; and adjusting a diagnosis policy for the first fault symptom according to the fault diagnosis result in response to the feedback indicating that the fault for the first fault symptom has been cleared;

wherein the fault diagnosis result includes a probability of occurrence of a specific fault based on the diagnosis policy.

10. The non-transitory machine readable medium of claim 9, wherein the fault diagnosis result is determined by diagnosing the fault for the first fault symptom based on the fault diagnosis information database, and in response to the feedback indicating that the fault for the first fault symptom has not been cleared, the method includes sending the first fault symptom to the fault diagnosis expert for fault diagnosis, receiving a subsequent fault diagnosis result from the fault diagnosis expert, returning the subsequent fault diagnosis result to the user terminal, receiving subsequent feedback on the subsequent fault diagnosis result from the user terminal, and in response to the subsequent feedback indicating that the fault for the first fault symptom has been cleared, updating the fault diagnosis information database according to the subsequent fault diagnosis result, and adjusting the diagnosis policy for the first fault symptom.

11. The non-transitory machine readable medium of claim 10, wherein the subsequent fault diagnosis result includes at least one possible fault causing the first fault symptom, the subsequent feedback indicates that the fault for the first fault symptom has been cleared, the subsequent feedback includes a fault actually causing the first fault symptom, and the updating the fault diagnosis information database according to the fault diagnosis result includes adding an association between the first fault symptom and the fault actually causing the first fault symptom to the fault diagnosis information database.

12. The non-transitory machine readable medium of claim 9, wherein the fault diagnosis result includes at least one possible fault causing the first fault symptom and information indicative of a probability of occurrence of each of the at least one possible fault, the feedback on the fault diagnosis result indicates that the fault has been cleared, the feedback on the fault diagnosis result includes the fault actually causing the first fault symptom, and the adjusting the diagnosis policy for the first fault symptom according to the fault diagnosis result includes increasing a probability of occurrence of the specific fault actually causing the first fault symptom.

* * * * *